(12) United States Patent
Basnett

(10) Patent No.: US 6,179,079 B1
(45) Date of Patent: Jan. 30, 2001

(54) MOTOR VEHICLE SAFETY APPARATUS

(75) Inventor: Michael Neil Basnett, Mardy (GB)

(73) Assignee: Rover Group Limited, Warwick (GB)

( * ) Notice: Under 35 U.S.C. 154(b), the term of this patent shall be extended for 0 days.

(21) Appl. No.: 09/514,082

(22) Filed: Feb. 28, 2000

(51) Int. Cl.$^7$ .................................................. B60N 3/06
(52) U.S. Cl. ................................................ 180/90.6; 296/75
(58) Field of Search ............................ 180/90.6; 296/75; 74/564

(56) References Cited

U.S. PATENT DOCUMENTS

| | | | |
|---|---|---|---|
| 2,761,329 | 9/1956 | Reed | ....................................... 74/564 |
| 3,047,088 | 7/1962 | Murrell . | |
| 3,860,284 | * 1/1975 | Lichtig | ................................ 180/90.6 |
| 4,726,438 | * 2/1988 | Stuertz et al. | ....................... 180/90.6 |

FOREIGN PATENT DOCUMENTS

| | | |
|---|---|---|
| 43 35 511 A1 | 5/1994 | (DE) . |
| 0798160A1 | 10/1997 | (EP) . |
| 2179898 | 3/1987 | (GB) . |

\* cited by examiner

Primary Examiner—Peter C. English
(74) Attorney, Agent, or Firm—Davis and Bujold

(57) ABSTRACT

A motor vehicle is disclosed having a foam pad 13 located in the vicinity of a foot pedal 14, 15. The foam pad 13 has a recess into which the pedal 14, 15 can be fully accommodated when it is fully depressed. The thickness of the foam pad 13 is such that the upper surface of the foot pad 15 of the foot pedal is co-planar with the surface of the foam pad 13 when the foot pedal is at its extreme of travel so that it may support a foot 5 applied to the foot pad 15.

13 Claims, 2 Drawing Sheets

MOTOR VEHICLE SAFETY APPARATUS

FIELD OF THE INVENTION

This invention relates to a motor vehicle and in particular to a safety apparatus for a motor vehicle to reduce the severity of injury to the lower leg of a driver of a motor vehicle involved in an accident.

BACKGROUND TO THE INVENTION

It is known to provide a motor vehicle with one or more foot pedals to operate such features as the brakes, clutch and fuel supply. It is a particular problem with the brake pedal, that in a crash situation the driver is normally pressing hard on the brake pedal to effect maximum braking of the motor vehicle, and, if the driver does not place his foot evenly on the pedal but applies it using one side of his foot, severe impact tends to result in twisting of the ankle and may result in serious injury. The same problem can occur with the other pedals, but is less likely as the driver is usually operating only the brake on impact.

It is known from GB 2 179 898 to provide a vehicle in which the floor of the driver's footwell beneath the foot pedals is covered with a layer of energy absorbing material to support the driver's foot in the event of a front impact. However it can be a problem with this type of system that the energy absorbing layer needs to be very firm to be of use under the high loads experienced in frontal impacts, and the problem of the driver's ankle being twisted therefore remains.

SUMMARY OF THE INVENTION

According to the invention there is provided a motor vehicle having a forward end and a rear end, a driver compartment including a footwell, a pedal located in the footwell for operation by a driver's foot and movable to an extreme of travel, a structural member situated forward of the pedal and defining part of the footwell, and a support overlying the structural member in the region of the pedal, wherein the support defines a recess into which the pedal can be received when at its extreme of travel so that the support around the recess can support a part of the driver's foot which overhangs the pedal.

The foot pedal may include a foot pad and a pedal arm.

The support means is preferably of sufficient thickness to form a substantially co-planar surface with the upper surface of the foot pad when the pedal is at its extreme of travel.

The support means may be formed from a structural foam material, or any other suitable energy absorbing material.

Preferably the support means extends below the pedal so as to provide support for the heel of the driver's foot.

More preferably the recess is shaped so as to fit the pedal, such that when the pedal is at its extreme of travel, the support means substantially surrounds the pedal.

The recess may comprise a narrow slot for receiving the pedal arm and a shallower depression for receiving the foot pad.

Preferably the vehicle comprises a further pedal and the support means defines a further recess for receiving said further pedal when at its extreme of travel.

Preferably the support means includes a raised portion forming a footrest for the driver.

The present invention further provides a motor vehicle having a forward end and a rear end, a driver compartment including a footwell, a pedal located in the footwell for operation by a driver's foot and movable to an extreme of travel, a structural member situated forward of the pedal and defining part of the footwell, and a layer of support material overlying the structural member, wherein the support material defines a recess into which the pedal can be received when at its extreme of travel so that the support material around the recess can support a part of the driver's foot which overhangs the pedal.

The invention will now be described by way of example with reference to the accompanying drawings.

DESCRIPTION OF THE PREFERRED EMBODIMENTS

Figure 1:
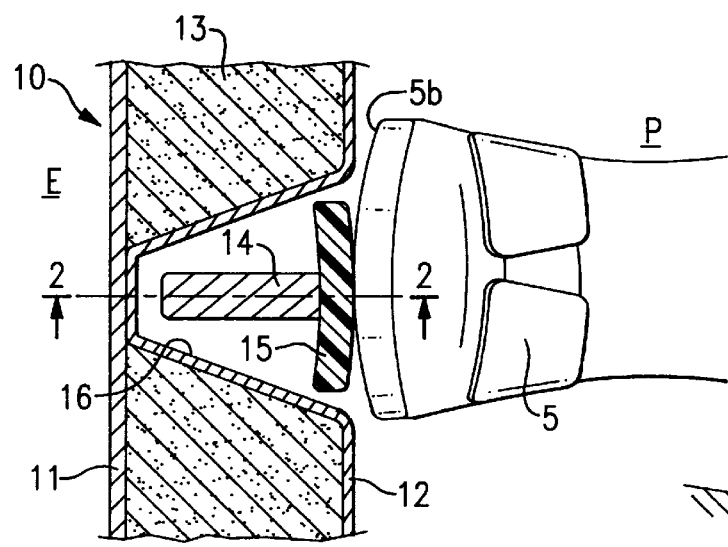
FIG. 1 is a plan cross-sectional view of part of a motor vehicle including a safety apparatus according to the invention.
Figure 3:
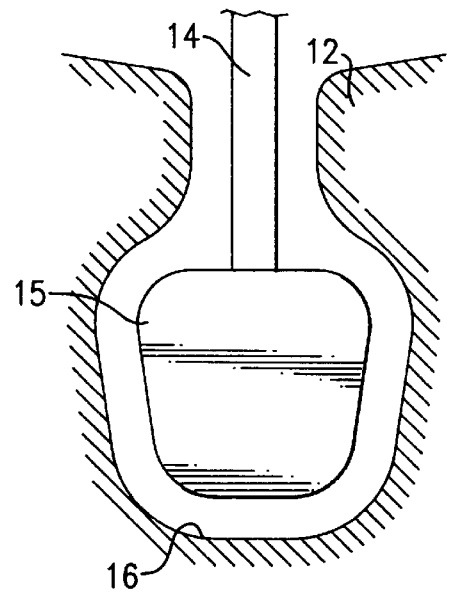
FIG. 3 is a front view of a pedal shown in FIG. 1.
Figure 2:
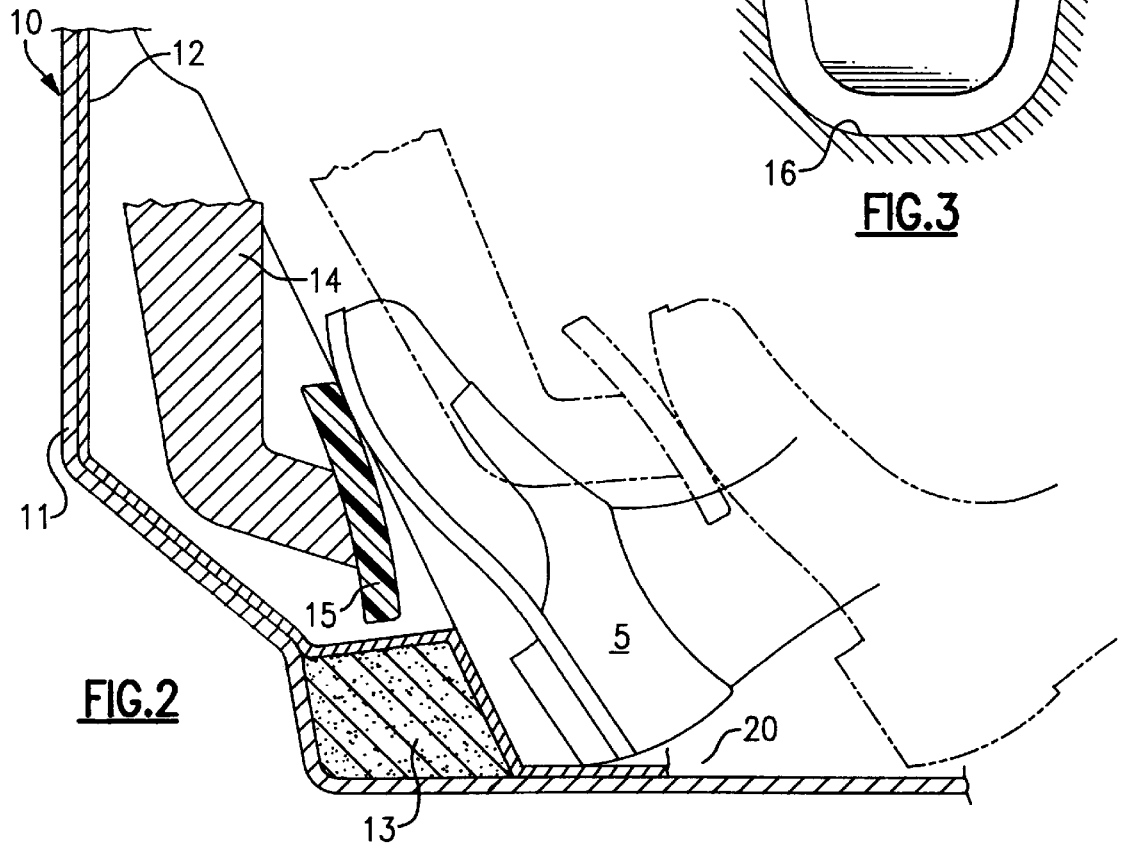
FIG. 2 is a cross-section on the line Z—Z on FIG. 1.

With reference to the FIGS. 1 to 3, in a first embodiment of the invention a motor vehicle has a structural footwell 11 formed in part by a front bulkhead 10 separating a passenger compartment P from an engine compartment E. A driver operable brake pedal, located in the footwell, comprises an arm 14 pivotably connected at its upper end to part of the body structure of the motor vehicle by pivot means (not shown) and a foot pad 15 attached to the lower or free end of the arm 14.

The bulkhead 10 is joined at its lower end to a floor member 20 which forms the bottom of the footwell. A carpet 12 lines the footwell, overlying both the floor 20 and the bulkhead 10. A layer of shock absorbing foam material overlies the part of the bulkhead forming the footwell and forms a foot support 13. It extends from the floor 20 to a position well above the height of the foot pad 15. The foam support 13 has a trough or recess 16 into which both the arm 14 and the pad 15 can be accommodated when the brake pedal is fully depressed to the extreme limit of its travel. This recess is shaped so as to correspond closely to the shape of the pedal 14, 15. As shown in FIG. 3, at its lower end the recess is just wider and longer than the foot pad 15, and higher up it is narrower so as to be just wider than the pedal arm 14. The support therefore extends beneath and to either side of the pedal, substantially surrounding it.

Generally under normal operating loads the pedal will travel about 70 to 80 mm from its fully released position which is shown in broken lines in FIG. 2. Under abusive loads this rises to about 100 mm. Under frontal impact conditions when the load on the pedal increases significantly beyond what the driver could voluntarily apply, the pedal travel increases further to about 120 or 130 mm, which is shown in solid lines in FIG. 2.

The foam support 13 is of sufficient thickness that when the brake pedal reaches its extreme limit of travel during impact, the upper surface of the pad 15 and the foam support 13 are approximately level, forming a substantially co-planar surface. Therefore if the driver's foot is not centrally located on the foot pad 15 but overhangs one side of it, a side portion 5b of the foot 5 comes into contact with the carpet 12 overlying the foam support 13, which thereby helps to reduce twisting of the driver's ankle. In addition, the presence of the foam support 13 below the lower edge of the foot pad 15, i.e. under the heel of the foot 5, ensures that the heel, which generally overhangs the lower edge of the foot pad 15, cannot easily be pushed under the foot pad 15 to cause damage to the driver's ankle.

Because the foot 5 contacts the carpet 12 overlying the foam support 13 before the arm 14 contacts the carpet overlying the bulkhead 11 the foot 5 is not suddenly brought into contact with an extremely high resistance to movement but rather contacts the foam support 13 and is subject to a cushioned resistance.

Figure 4:
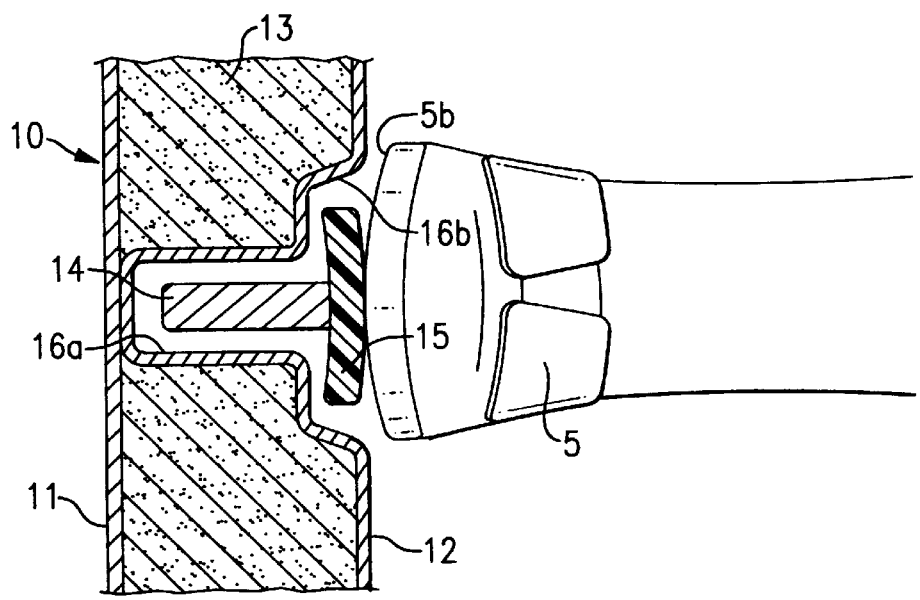
FIG. 4 is a section through part of a vehicle according to a second embodiment of the invention.
Figure 5:
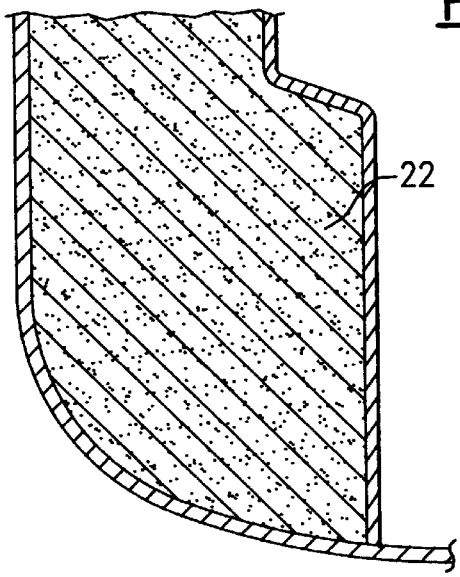
FIG. 5 is a front view of a pedal shown in FIG. 4.
Figure 5:
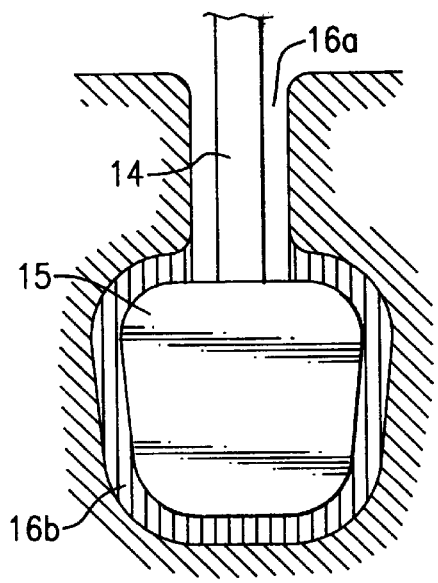

Referring to FIGS. 4 and 5, in a second embodiment the foam support 13 is shaped so as to fit more closely to the shape of the brake pedal 14, 15. The recess 16 comprises a narrow slot 16a for receiving the pedal arm 14, and a broader, shallower depression 16b at the lower end of the slot 16a for receiving the foot pad 15. The support 13 extends continuously across the full width of the footwell and has similar recesses for the accelerator and clutch pedals (not shown). It therefore provides support and cushioning or the driver's right foot whether it is on the accelerator pedal, or the brake pedal, or between the two at the time of impact. At the left hand edge of the footwell, just to the left of the clutch pedal, a raised section 22 is provided in the support 13 which forms a foot rest for the driver's left foot.

The closer fitting of the recess 16 to the shape of the pedal in this embodiment means that there is more of the foam support material close to the pedal 14, 15. Therefore maximum support for the driver's foot can be provided even if the pedals are relatively close together. The formation of the foot rest 22 from the foam material, which can be moulded to the desired shape, makes the footrest and foot support simple to manufacture and also provides a level of cushioning of the driver's left foot if it is on the footrest during impact. Furthermore, as the foam support is shaped to fit in the footwell, it can be easily and accurately located relative to the pedals.

What is claimed is:

1. A motor vehicle having a forward end and a rear ends a driver compartment including a footwell, A pedal located in the footwell for operation by a driver's foot and movable to an extreme of travel, a structural member situated forward of the pedal and defining part of the footwell, and a support overlying the structural member in the region of the pedal, wherein the support defines a recess into which the pedal can be received when at its extreme of travel so that the support around the recess can support a part of the driver's foot which overhangs the pedal.

2. A motor vehicle as claimed in claim 1 in which the foot pedal includes, a foot pad and a pedal arm.

3. A motor vehicle according to claim 2 wherein the foot pad has an upper surface and the support is of sufficient thickness to form a substantially co-planar surface with said upper surface when the pedal is at its extreme of travel.

4. A motor vehicle according to claim 2 wherein the recess comprises a narrow slot for receiving the pedal arm and a shallower depression for receiving the foot pad.

5. A motor vehicle as claimed in claim 1 in which the support is formed from a structural foam material.

6. A motor vehicle as claimed in claim 1 wherein said tart of the driver's foot is a heel part and the support extends below the pedal so as to provide support for said heel part.

7. A motor vehicle as claimed in claim 5 in which the recess is shaped so as to fit the pedal, such that when the pedal is at its extreme of travel, the support substantially surrounds the pedal.

8. A motor vehicle according to claim 1 comprising a further pedal also movable to an extreme of travel wherein the support defines a further recess for receiving said further pedal when at its extreme of travel.

9. A motor vehicle according to claim 8 wherein said other pedal is an accelerator pedal.

10. A motor vehicle according to claim 9 wherein the support extends continuously between the recesses for the two pedals.

11. A motor vehicle according to claim 1 wherein the support includes a raised portion forming a footrest for the driver.

12. A motor vehicle according to claim 1 wherein the pedal is a brake pedal.

13. A motor vehicle having a forward end and a rear end, a driver compartment including a footwell, a pedal located in the footwell for operation by a driver's foot and movable to an extreme of travel, a structural member situated forward of the pedal and defining part of the footwell, and a layer of support material overlying the structural member, wherein the support material defines a recess into which the pedal can be received when at its extreme of travel so that the support material around the recess can support a part of the driver's foot which overhangs the pedal.

* * * * *